Dec. 29, 1964  P. TEMPEL  3,163,059
SWIVEL PIN OPENER AND CLOSER AND HOOK HOLDER
Filed Aug. 28, 1962
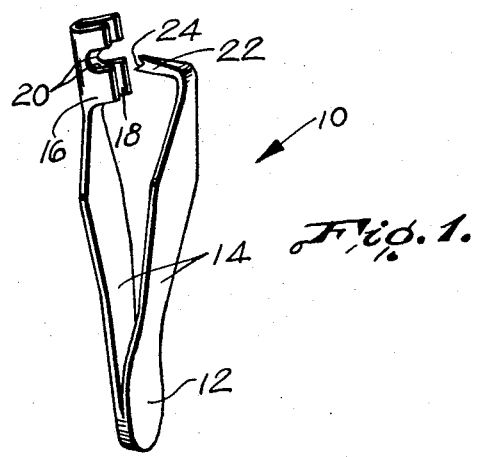
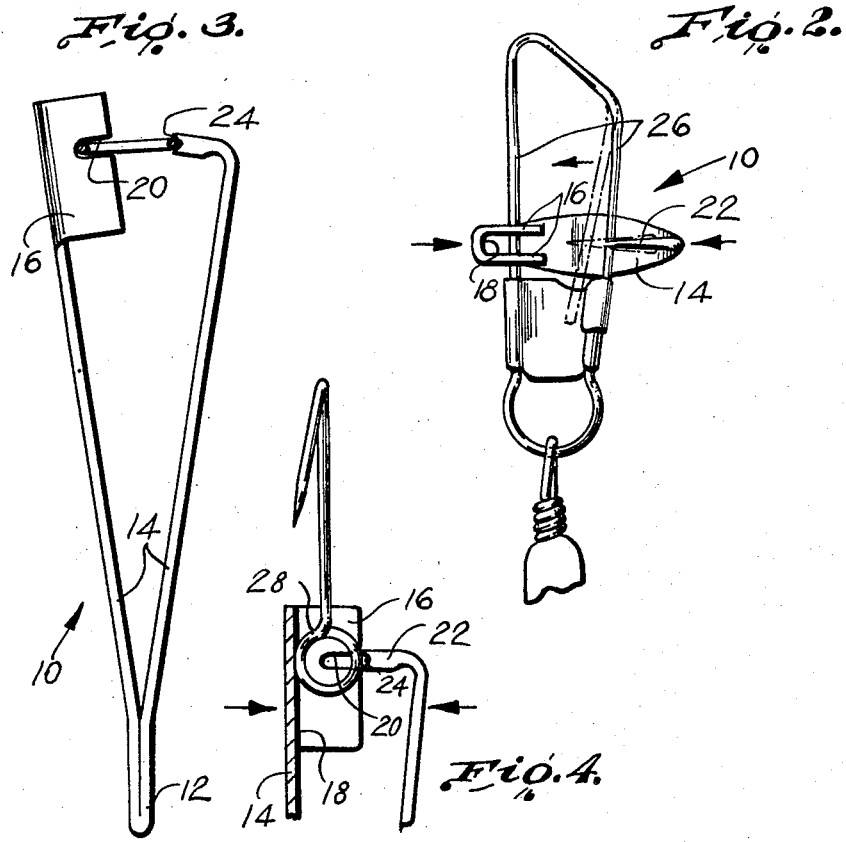

United States Patent Office 3,163,059
Patented Dec. 29, 1964

3,163,059
SWIVEL PIN OPENER AND CLOSER AND HOOK HOLDER
Philip Tempel, Marion, S. Dak.
Filed Aug. 28, 1962, Ser. No. 220,093
1 Claim. (Cl. 81—3)

This invention relates to hand tools and more particularly to a device for baiting a hook.

It is an object of the present invention to provide a swivel pin opener and closer and hook holder for baiting a fishing hook in a safe and convenient manner.

A further object of the present invention is to provide a device which will facilitate the handling of fishing hooks during baiting thereof, to avoid damage in the bait and to avoid impaling the fingers with the hook.

Other objects of the invention are to provide a swivel pin opener and closer and hook holder bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a perspective view of a swivel pin opener and closer and hook holder made in accordance with the present invention;

FIGURE 2 is a side elevational view of the device shown in FIGURE 1 in actual use during the opening and closing of the swivel pin;

FIGURE 3 is a side elevational view of the assembly shown in FIGURE 2; and

FIGURE 4 is a fragmentary cross sectional view illustrating the use of the device for holding a hook during the application of bait thereto.

Referring now more in detail to the drawing, and more particularly to FIGURES 1 to 3 thereof, a swivel pin opener and closer and hook holder for baiting a hook 10 made in accordance with the present invention is shown to include a base 12 having a pair of upwardly and outwardly diverging spring arms 14. One of the spring arms 14 is provided with a channel shaped housing 16 having a longitudinal groove 18 and a pair of U-shaped notches 20 in the path of movement of an angularly related portion 22 on the other arm 14, said portion 22 having a notch 24 movable into the channel 18 during squeezing action upon the arms 14.

Referring now specifically to FIGURES 2 and 3 of the drawing, the device is shown in actual use opening and closing a swivel pin 26, in which the opposite sides thereof are received within the notches 20, 24 of the spring arms, whereby a single pressure upon the arms 14 facilitates the disengagement of the swivel pin being handled.

In FIGURE 4 of the drawing, the device is shown in actual use holding a hook shank eye 28 during the application of bait thereto, in which use the eye 28 is received within the channel 18 and the angularly related portion 22 to exert a retaining pressure thereupon.

While various changes may be made in the detail construction, it shall be understood that such changes shall be within the spirit and scope of the present invention as defined by the appended claim.

What I claim as new and desire to protect by Letters Patent of the United States is:

A combination swivel pin opener and fish hook closer comprising:

(a) first and second spring arms joined at one end;

(b) a channel member at the other end of the first arm providing a bottom wall and a pair of parallel walls projecting toward the second arm having a spacing therebetween for the reception of the eye of a fish hook, (c) the free edges of said parallel walls remote from said bottom wall being provided with aligned parallel notches each having spaced parallel sides so that a swivel pin can be placed therein, and (d) a pressure member on said second spring arm of a thickness to fit between said parallel walls and longitudinally registrable with said parallel notches, (e) said pressure member having a notch extending transversely thereacross, (f) whereby said pressure member can engage one side portion of a swivel pin when an opposite side portion is placed in said aligned notches to open said pin when sufficient force is applied to said pressure member, and said pressure member can engage one side of the eye of a fish hook to urge the other side thereof against said bottom wall to a clamp said eye and thus facilitate the baiting of the hook, said parallel walls preventing tilting of said hook eye to either side.

References Cited by the Examiner
UNITED STATES PATENTS

| | | | |
|---|---|---|---|
| 533,923 | 2/95 | Seyfriedt | 81—43 X |
| 721,480 | 2/03 | Van Schott. | |
| 753,048 | 2/04 | Des Moineaux | |
| 1,141,916 | 6/15 | Aderer. | |
| 1,289,028 | 12/18 | Willemin | 81—3.6 |
| 1,753,080 | 4/30 | Zwilling et al. | 81—3.6 |
| 2,279,068 | 4/42 | Siebrandt. | |

WILLIAM FELDMAN, *Primary Examiner.*